United States Patent
Tumati et al.

(10) Patent No.: US 6,871,489 B2
(45) Date of Patent: Mar. 29, 2005

(54) THERMAL MANAGEMENT OF EXHAUST SYSTEMS

(75) Inventors: Prasad Tumati, Greenwood, IN (US); John P. Nohl, Indianapolis, IN (US); Wilbur H. Crawley, Columbus, IN (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/417,392

(22) Filed: Apr. 16, 2003

(65) Prior Publication Data

US 2004/0206069 A1 Oct. 21, 2004

(51) Int. Cl.[7] .............................................. F01N 3/00
(52) U.S. Cl. ........................... 60/285; 60/274; 60/286; 60/295; 60/298; 60/300; 60/311; 60/320
(58) Field of Search ...................... 60/274, 285, 286, 60/295, 297, 298, 300, 301, 303, 311, 320

(56) References Cited

U.S. PATENT DOCUMENTS

| | | | |
|---|---|---|---|
| 4,902,487 A | | 2/1990 | Cooper et al. |
| 5,201,802 A | | 4/1993 | Hirota |
| 5,447,696 A | | 9/1995 | Harada |
| 5,511,413 A | | 4/1996 | Pfister |
| 5,685,145 A | * | 11/1997 | Sung et al. .................... 60/284 |
| 5,711,149 A | * | 1/1998 | Araki ........................... 60/278 |
| 5,983,628 A | * | 11/1999 | Borroni-Bird et al. ......... 60/274 |
| 6,314,722 B1 | * | 11/2001 | Matros et al. ................. 60/274 |
| 6,318,077 B1 | * | 11/2001 | Claypole et al. ............... 60/303 |
| 6,347,511 B1 | * | 2/2002 | Haines ........................ 60/274 |
| 6,357,226 B2 | * | 3/2002 | Borland ........................ 60/298 |
| 6,427,436 B1 | | 8/2002 | Allansson et al. |
| 6,446,430 B1 | | 9/2002 | Roth et al. |
| 6,464,744 B2 | | 10/2002 | Cutler et al. |
| 6,568,179 B2 | * | 5/2003 | Deeba ......................... 60/298 |
| 6,571,551 B2 | * | 6/2003 | Lundgren et al. .............. 60/298 |

FOREIGN PATENT DOCUMENTS

| | | |
|---|---|---|
| DE | 44 08 826 C1 | 5/1995 |
| DE | 100 62 956 A1 | 6/2002 |
| WO | WO 03/025357 A1 | 3/2003 |

OTHER PUBLICATIONS

Brochure entitled "High–Temperature Exhaust–Gas Control Valve", by Dr. Phillip Bush, published by ArvinMeritor OE, LLC; Copyright 2002.
Brochyre entitled "Exhaust Gas Temperature Control and Heat Recovery", by Johannes Hartick, published by Arvin-Meritor OE, LLC; Copyright 2002.
Brocure entitled "Development of a Particular Trap System with Burner–Supported Regeneration", by Dr. Paul Zelenka and Clive Telford, published by ArvinMeritor OE, LLC; Copyright 2002.

* cited by examiner

Primary Examiner—Binh Q. Tran
(74) Attorney, Agent, or Firm—Barnes & Thornburg

(57) ABSTRACT

The present invention involves thermal management of an integrated emission reduction system for the removal of particulate matter (PM) and nitrogen oxides (NOx) from diesel engine exhaust streams. The inventive integrated emission reduction system may include a diesel particulate filter (DPF), a heat source for adjusting the temperature of the exhaust stream entering the DPF, at least one selective catalytic reducer of NOx, a heat exchanger for adjusting the temperature of the exhaust stream entering the NOx reducer, and a computing device for monitoring the temperature and/or pressure of the exhaust stream entering the DPF and the NOx reducer, and for controlling the operation of the heat exchanger and heat source, thereby improving the efficiency of the DPF and the NOx reducer.

20 Claims, 6 Drawing Sheets

THERMAL MANAGEMENT OF EXHAUST SYSTEMS

BACKGROUND OF THE INVENTION

1. Field of the Invention

The present invention relates to exhaust emission reduction systems for the removal of particulate matter and reactive nitrogen oxides (NOx) from diesel engine exhaust streams, and, more particularly, to improving the efficiency of emission reduction systems having a selective catalytic reduction component.

2. Description of the Related Art

Diesel engine combustion exhausts include carbon dioxide, carbon monoxide, unburned hydrocarbons, NOx, and particulate matter (PM). Increasingly, environmental regulations call for emissions controls to progressively lower diesel exhaust emission levels for NOx and PM. For example, EURO 4 (2005) and EURO 5 (2008) and U.S. 2004 and U.S. 2007 emissions limit standards. Regulations are increasingly limiting the amount of NOx that can be emitted during a specified drive cycle, such as an FTP (Federal Test Procedure) in the United States or an MVEG (Mobile Vehicle Emission Group) in Europe.

One of the ways known in the art to remove NOx from diesel engine exhaust gas is by catalyst reduction. A catalyst reduction method essentially comprises passing the exhaust gas over a catalyst bed in the presence of a reducing gas to convert the NOx into nitrogen. Two types of catalytic reduction are nonselective catalyst reduction (NSCR) and selective catalyst reduction (SCR). This invention relates to emission reduction systems including the SCR type of catalytic reduction.

Roth et al., U.S. Pat. No. 6,446,430, discloses a method and apparatus for reducing transient and steady-state NOx emissions in the exhaust gases of a vehicle powered by a diesel-fueled internal combustion engine which includes a reducing catalytic converter downstream of the engine. The catalytic converter includes a reducing catalyst and a system for injecting fuel oil as hydrocarbon (HC) reductant into the exhaust gas upstream of the catalytic converter. Roth recognizes that transient engine conditions will increase the temperature of the exhaust gas which, in turn, will raise the temperature of the catalytic converter to the point where the temperature window in which NOx conversion occurs may be exceeded.

Conversion efficiency of NOx catalysts is temperature dependent. The efficient operation temperature range is generally between 150 and 500° C., depending on the catalyst. Above 750 to 800° C. catalysts may be damaged. During engine operations involving high loads, exhaust gas temperatures may exceed these ranges.

Diesel particulate filters (DPF) for the removal of PM from a diesel engine exhaust stream have been proven to be extremely efficient at removing carbon soot. A widely used DPF is the wall flow filter which filters the diesel exhaust by capturing the particulate material on the porous walls of the filter body. Cutler et al., U.S. Pat. No. 6,464,744, discloses a porous ceramic diesel exhaust particulate filter. The ceramic filter includes a plurality of end-plugged honeycomb structures which in combination act to trap and combust diesel exhaust particulates. As particulate material collects, eventually the pressure drop across the filter rises to create back pressure against the engine and regeneration of the filter becomes necessary. The regeneration process involves heating the filter to initiate combustion of the carbon soot. Normally, the regeneration is accomplished under controlled conditions of engine management whereby a slow burn is initiated and lasts a number of minutes, during which the temperature in the filter rises from about 400 to 600° C. to a maximum of about 800 to 1,000° C.

In currently available systems, there is a problem of effective combustion of diesel PM at exhaust stream temperatures of 300° C. or below. While the temperature of diesel exhaust stream may exceed 500° C., it is generally considerably lower, e.g., 300° C. or below, especially under a low engine load condition, and, as noted above, catalytic filters are not particularly effective for combusting particulate at such low temperatures. In addition, carbon combustion by thermal means requires temperatures of up to 600° C.

While the above systems have been found beneficial in reducing certain diesel exhaust emissions, it has also been found beneficial if such systems are operated at temperatures that maximize their efficiency. Specifically, DPF regeneration is accomplished at a temperature above a particular threshold, often a temperature higher than typical diesel exhaust stream temperatures, and NOx catalysts, such as SCR, operate most efficiently in a temperature window of typically 300° C. to 450° C.

SUMMARY OF THE INVENTION

The present, invention involves thermal management of an integrated emission reduction system for the removal of particulate matter (PM) and nitrogen oxides (NOx) from diesel engine exhaust streams. The inventive integrated emission reduction system may include a diesel particulate filter (DPF), a heat source for adjusting the temperature of the exhaust stream entering the DPF, at least one selective catalytic reducer of NOx, a heat exchanger for adjusting the temperature of the exhaust stream entering the NOx reducing unit, and a computing device for monitoring the temperature of the exhaust stream entering the DPF and the NOx reducing unit, and for controlling the operation of the heat exchanger and heat source, thereby improving the efficiency of the DPF and the NOx reducing unit.

An exemplary embodiment of the emission reduction system receives an exhaust stream from a diesel engine powering a vehicle. The exhaust stream is directed through a diesel oxidation catalyst (DOC), a heat exchange system, an NOx reducing unit, a DPF, and a muffler if needed. The emission reduction system includes an engine control unit (ECU) for monitoring and controlling the exhaust stream emission reduction process.

Conversion efficiency of NOx catalysts is temperature dependent. Incineration of PM is also temperature dependent. Therefore, it is beneficial if the exhaust stream entering various emission reduction system components, such as the DPF and the NOx reducing unit, are adjusted to a temperature that maximizes the efficiency of the system components. Specifically, it is often beneficial to increase the temperature of the exhaust stream entering the DPF to combust accumulated soot, thereby reducing the back pressure of the DPF on the exhaust. Also, it may be beneficial to increase or decrease the temperature of the exhaust stream entering the NOx reducing unit to a specific temperature window.

In one form, an exhaust emission reduction system adapted to reduce the emissions produced in the exhaust stream of a diesel engine is provided and includes a controller adapted to control the operations of the diesel engine, at least one temperature adjustment mechanism placed in the exhaust stream of the diesel engine and which is controlled by the controller and adapted to adjust a temperature of the exhaust stream, and at least one emissions removal device in communication with the temperature adjustment mechanism and adapted to remove emissions from the temperature adjusted exhaust stream.

In another form thereof, an exhaust emissions reduction system for diesel engines is provided with the diesel engine producing an exhaust stream containing particulate matter and emissions, and the exhaust emissions reduction system includes an emissions oxidation device, a heat exchanger in communication with the emissions oxidation device and adapted to change a temperature of the exhaust stream and a selective catalytic reduction device in communication with the heat exchanger and adapted to chemically alter and reduce emissions in the temperature adjusted exhaust stream. The exhaust emissions reduction system also includes a filter to remove particulate matter from the exhaust stream, a heat generating source in communication with the filter capable of cleaning the filter, at least one sensor disposed in the exhaust stream and sensing the temperature of the exhaust stream, and a controller in communication with the heat exchanger and the heat generating source and adapted to control operations of the heat exchanger and the heat generating source based upon the temperature sensed by the sensor.

In yet another form thereof, a method of reducing emissions produced by a diesel engine is provided and includes producing an exhaust stream from the diesel engine, adjusting a temperature of the exhaust stream, and removing emissions from the temperature adjusted exhaust stream.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
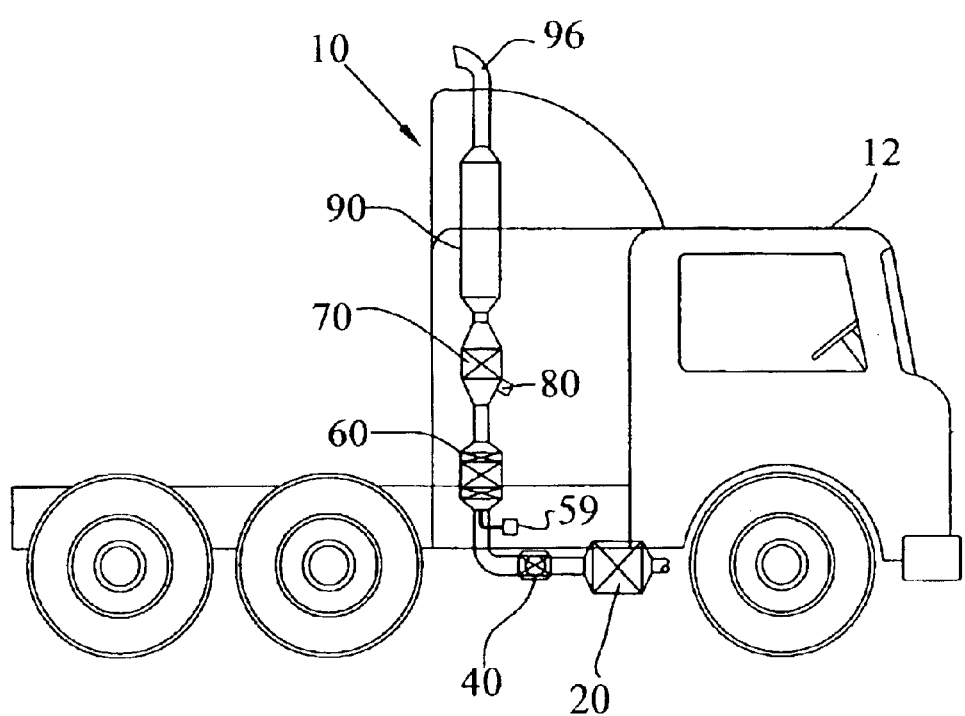
FIG. 1 is an assembly view of an integrated emission reduction system provided on a diesel engine-powered vehicle according to the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

Figure 2:
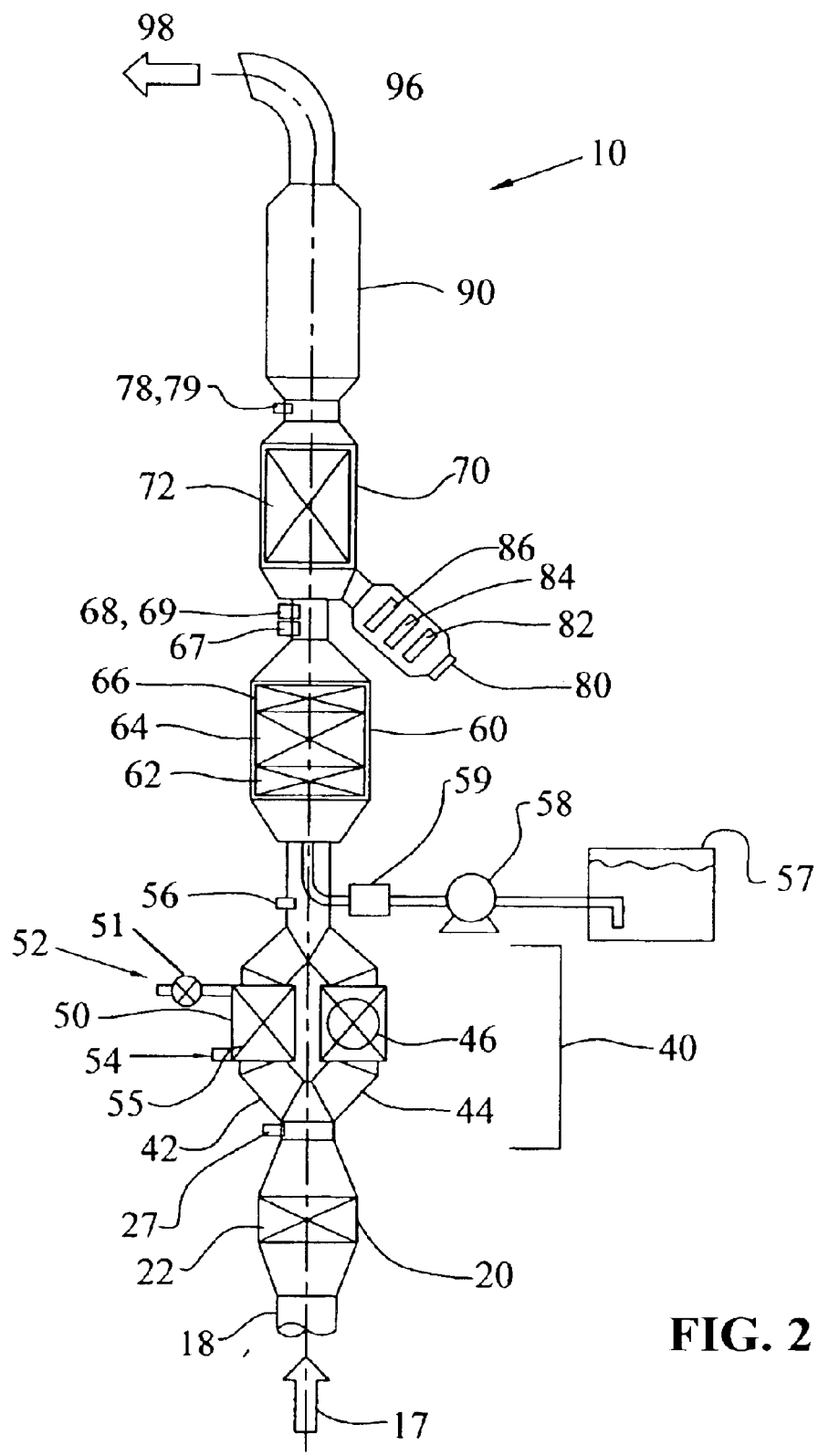
FIG. 2 is a plan view of the integrated emission reduction system of FIG. 1.
Figure 3:
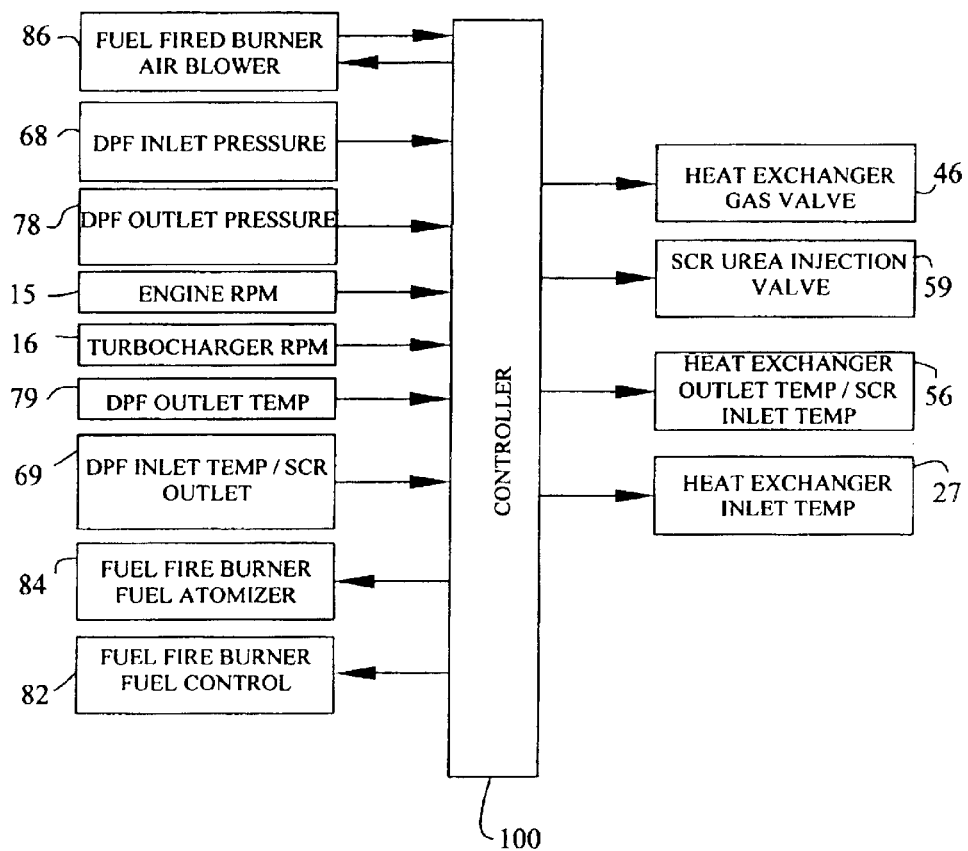
FIG. 3 is a block diagram of a control system for controlling the integrated emission reduction system of FIG. 1.

Vehicle 12, shown in FIG. 1, is powered by a diesel engine (not shown) and includes exhaust emission reduction system 10 for removing particulate matter (PM) and reactive nitrogen oxides (NOx) from diesel engine exhaust stream 17, shown in FIG. 2. Referring to FIGS. 1 and 2, emission reduction system 10 generally includes diesel oxidation catalyst (DOC) 20, heat exchange system 40, selective catalytic reduction (SCR) system or NOx reducer 60, diesel particulate filter 70, heat source, or diesel fired burner, 80, muffler 90, exhaust pipe 96, and control system 100, shown in FIG. 3. The inventive method and control system 100 for thermal management of exhaust emission reduction system 10 provides increased efficiency for emission reduction systems having a selective catalytic reduction components.

Referring to FIG. 2, diesel oxidation catalyst (DOC) 20 reduces the unburned hydrocarbons (HC) and carbon monoxide (CO) present in diesel exhaust. DOC 20 catalyze the oxidation of the unburned HC and CO. Such a device is well known in the art and a suitable example available from ArvinMeritor of Columbus, Ind., is Part No. DOC2007977.

Heat exchange system 40 provides temperature adjustment, generally cooling, of the diesel engine exhaust. Heat exchange system 40 includes exchange path 42 and bypass path 44 coupled as parallel conduits for a flow of diesel engine exhaust. Exchange path 42 contains heat exchanger 50, which includes heat exchange structure 55 supplied with a flow of coolant controlled by coolant control valve 51 and provided via coolant inlet 52 and coolant outlet 54. The coolant may be from the existing engine cooling system, provided cooling capacity is available, for example, in light-duty vehicles 12, or from a separate independent cooling system on vehicle 12, for example, in heavy-duty vehicles 12 in which reserve cooling capacity may be limited.

Bypass path 44 includes heat exchange valve 46, which, in the exemplary embodiment, may be a high-temperature exhaust gas control valve, such as Part No. SK030503, manufactured by ArvinMeritor of Columbus, Ind. Flow of the engine exhaust through heat exchanger 50 is dependent on the resistance to flow provided in bypass path 44 by valve 46. For example, if valve 46 closes bypass path 44, the flow of engine exhaust through heat exchanger 50 will be increased, and, if valve 46 is open allowing flow of exhaust through bypass path 44, the flow of engine exhaust through heat exchanger 50 will be decreased. An exemplary heat exchanger 50 is Part No. 1202496, manufactured by Behr America, Inc. of Troy, Mich.

SCR system 60 generally includes three components for catalysis of the exhaust stream. Hydrolysis catalyst 62 is the first stage of SCR system 60 and at this point urea, from tank 57, is added via pump 58 and urea injection valve 59. During this stage, the urea mixes with exhaust stream 17. After passing through hydrolysis catalyst 62, exhaust stream 17 passes through SCR catalyst 64 wherein nitrogen is generated from urea and NOx in exhaust stream 17. After SCR catalyst 64, exhaust stream 17 passes into ammonia slip catalyst 66 wherein excess ammonia as measured by ammonia sensor 67 is removed from exhaust stream 17. An exemplary ammonia sensor is, for example, a unit functionally similar to Part No. LDS3000, manufactured by Siemans Laser Analytics AB of Goteborg, Sweden. If excess ammonia is produced, sensor 67 sends a signal to an engine control unit (controller 100) to vary valve 59 to control injection of urea. Alternatively if too little ammonia, in comparison to the emissions, is produced, valve 59 will be opened more to facilitate injection of urea DPF 70 includes filter structure 72 for trapping and combusting diesel exhaust PM, such as carbon soot. Filter structure 72 is well known in the art and may be, for example, a porous ceramic forming a plurality of end-plugged honeycomb structures that are efficient at removing carbon soot from the exhaust of diesel engines. DPF 70 may be, for example, Part No. R990, manufactured by Corning Incorporated of Corning, N.Y., or a filter according to U.S. Pat. No. 6,464,744.

Heat source 80 is capable of increasing the temperature of the exhaust of diesel engines. Specifically, heat source 80 should be capable of increasing the exhaust temperature to the ignition temperature of carbon soot, which may be in the range of at least 400° to 600° C., or at least 350° to 450° C. if a catalytic treated DPF is used. Set point S2, hereinafter defined as a temperature sufficient to combust carbon soot, is in the range of 600° to 650° C. Heat source 80 in the exemplary embodiment, for example, includes a diesel fuel-fired burner, such as Part No. 2010942, manufactured by ArvinMeritor. Such a heat source 80 includes fuel control 82 for controlling diesel fuel supplied to heat source 80, fuel atomizer air control 84 for controlling the atomization of the diesel fuel for combustion, and air blower control 86 for controlling air flow for the combustion of the diesel fuel by heat source 80.

Muffler 90 and exhaust pipe 96 provide engine exhaust noise reduction and directing of vented engine exhaust stream 98.

Figure 4:
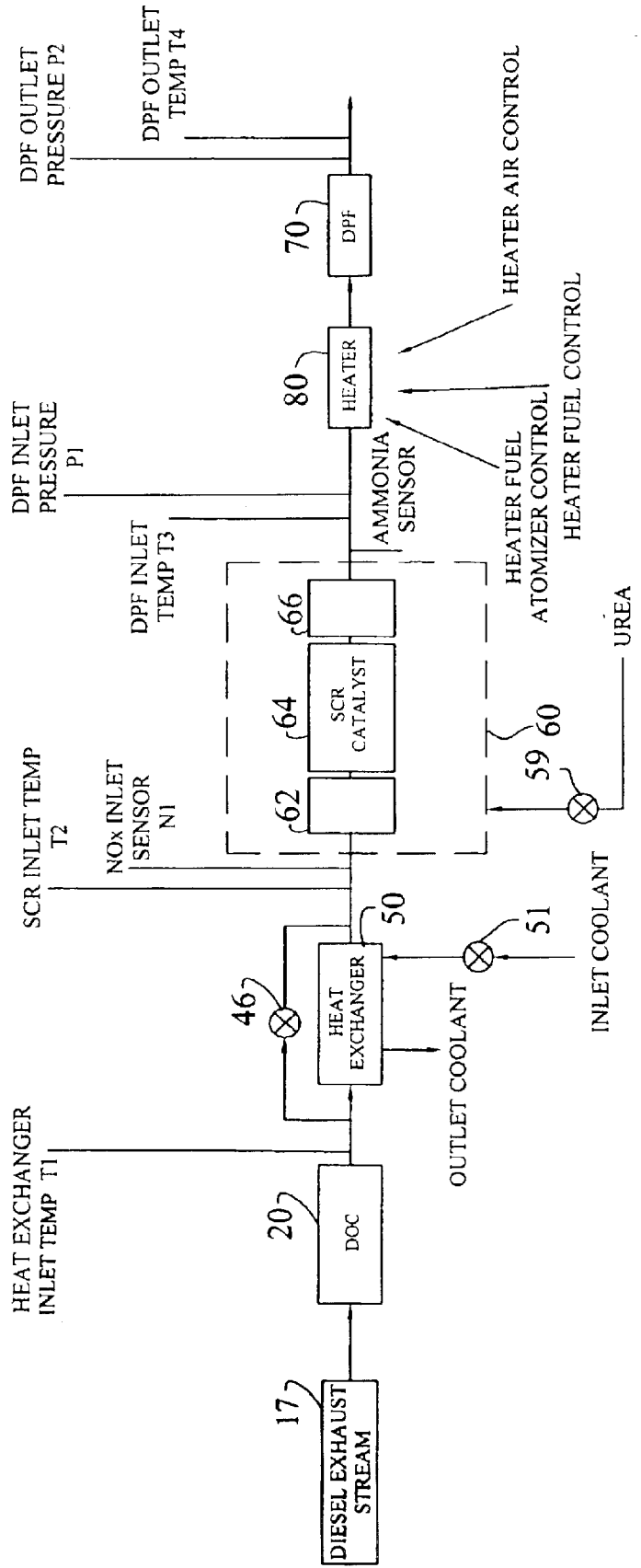
FIG. 4 is a process diagram of the integrated emission reduction system of FIG. 1.

Referring generally to FIGS. 2 and 4, in the exemplary embodiment, exhaust stream 17 from a diesel engine is delivered to exhaust emission reduction system 10 via engine exhaust connection 18. Engine exhaust connection 18 is coupled to DOC 20. The temperature T1 of exhaust stream 17 exiting DOC 20 and entering heat exchanger 50 is monitored by control device 100 using heat exchanger inlet temperature sensor 27. By monitoring temperature T1, controller 100 is able to adjust heat exchanger 50 to vary the temperature of exhaust stream 17 entering SCR system 60.

The flow of exhaust stream 17 through heat exchange system 40 and the resulting temperature change to exhaust stream 17 is controlled by control device 100 using heat exchanger valve 46 and coolant valve 51. Additionally, the cooling of exhaust stream 17 passing through heat exchange system 40 is controlled by the flow of exhaust stream 17 through heat exchanger 50, a function of heat exchanger valve 46 partially or fully opening or closing bypass path 44 and forcing exhaust stream 17 through heat exchanger 50, and also a function of the flow of coolant through heat exchanger 50 controlled by coolant valve 51.

The temperature T2 of exhaust stream 17 exiting heat exchange system 40 and entering SCR system 60 is monitored by control device 100 using SCR inlet temperature sensor 56, which also serves to monitor the outlet temperature of heat exchanger 50. As necessary, the temperature of the exhaust stream is lowered by heat exchange system 40 from the temperature of the exhaust stream of DOC 20 in the direction of an optimized temperature for NOx absorption in SCR 60.

Exhaust stream 17 exiting SCR system 60 is supplied to DPF 70. The temperature (T3) and pressure (P1) of exhaust stream 17 entering DPF 70 are monitored by control device 100 using DPF inlet pressure sensor 68 and DPF inlet temperature sensor 69. Control device 100 may control the temperature of exhaust stream 17 entering DPF 70 by controlling heat source 80. Specifically, control device 100 may control fuel control 82, fuel atomizer air control 84, and combustion air blower control 86, to increase the temperature of exhaust stream 17 entering DPF 70 to a desired level. The temperature (T4) and pressure (P2) of exhaust stream 17 exiting DPF 70 is monitored by control device 100 using DPF outlet pressure sensor 78 and DPF outlet temperature sensor 79. Finally, exhaust stream 17 flows through sound-reducing muffler 90 and exhaust pipe 96, exiting integrated emission reduction system 10 as vented exhaust stream 98.

Thermal management of integrated emission reduction system 10 provides improved efficiency of the removal of NOx and PM from diesel engine exhaust stream 17. In particular, a thermal transfer system, including heat exchange system 40 and heat source 80 in the exemplary embodiment, is controlled by control device 100 to adjust the temperature of exhaust stream 17 entering SCR system 60 and to adjust the temperature of exhaust stream 17 entering DPF 70 to a temperature window, thereby increasing the efficiency of the operation of DPF 70 and SCR system 60.

DPF 70 provides trapping and incineration of PM, generally carbon soot. At low engine load conditions, exhaust stream 17 may have a temperature of 300° C. or below, which may have been further lowered by heat exchange system 40. Monitoring of DPF inlet temperature (T3) by sensor 69 allows control device 100 to increase the temperature of exhaust stream 17 entering DPF 70 by controlling heat source 80. Although DPF 70 traps PM regardless of the temperature of exhaust stream 17, incineration of PM and regeneration of DPF 70 may require a temperature higher than that of exhaust stream 17. Heat source 80 is capable of increasing exhaust stream 17 temperatures to a range providing regeneration of DPF 70.

Control device 100 monitors DPF inlet pressure (P1) and DPF outlet pressure (P2) using inlet pressure sensor 68 and outlet pressure sensor 78 to determine whether excess trapped particulate matter in DPF 70 requires that DPF 70 be recharged. Excess trapped PM in DPF 70 may result in excessive back pressure in exhaust stream 17 and against SCR system 60. Excess trapped PM is removed from DPF 70 by a regeneration cycle consisting of increasing the temperature within DPF 70 so that trapped PM is incinerated. This may be accomplished, for example, by periodic increase in the temperature of exhaust stream 17 using heat source 80 to a temperature more than 600° C., and preferably more than 650° C., and for catalyst treated DPFs, more than 350° C., and preferably more than 450° C., but less than a combustion temperature causing damage to filter structure 72 within DPF 20, for example, less than 800° C., and more preferably less than 750° C. This may be accomplished, for example, by periodic increase in the temperature of exhaust stream 17 using heat source 30 to a temperature more than 600° C., and preferably more than 650° C., and for catalyst treated DPFs, more than 350° C., and preferably more than 450° C., but less than a combustion temperature causing damage to filter structure 22 within DPF 20, for example, less than 800° C., and more preferably less than 750° C.

SCR system 60 provides increased efficiency when the temperature T2 of exhaust stream 17 entering hydrolysis catalyst 62 is within the temperature window that provides increased efficiency for hydrolysis catalyst 62, SCR catalyst 64, and ammonia slip catalyst 66 that is used. Set point S1, hereinafter defined as an efficient operating window for SCR system 60 and the specific catalyst, is in the range of 280° to 410° C. for a $V_2O_5$ (vanadium pentoxide) and $TiO_2$ (titanium oxide) catalyst. Alternative catalysts and efficient operating temperatures include platinum, 150° to 210° C.; modified platinum, 250° to 330° C.; and zeolite, 350° to 500° C.

If other catalysts are used in place of catalyst 62, 64, and 66, a slightly different temperature window may be needed according to the operating efficiency of the catalyst. Thus, for low engine load conditions or immediately after start-up, exhaust stream 17 may have a temperature below the preferred temperature window, and thus control device 100 may control heat exchanger 50 and an additional heat source (not shown) to vary SCR system inlet temperature T2 to within the preferred temperature window.

Additionally, during normal engine load conditions, or because of increased heating of exhaust stream 17 by other sources, it is likely that the temperature T2 of exhaust stream 17 entering SCR system 60 will be higher than the preferred temperature window. Therefore, control device 100 may control cooling of exhaust stream 17 by partially or fully closing exhaust stream 17 flow through bypass 44 using valve 46, and increase coolant flow by partially or fully opening coolant control valve 51, which provides coolant to heat exchanger 50, and thus reduces temperature T2 of exhaust stream 17 entering SCR system 60.

Figure 5A:
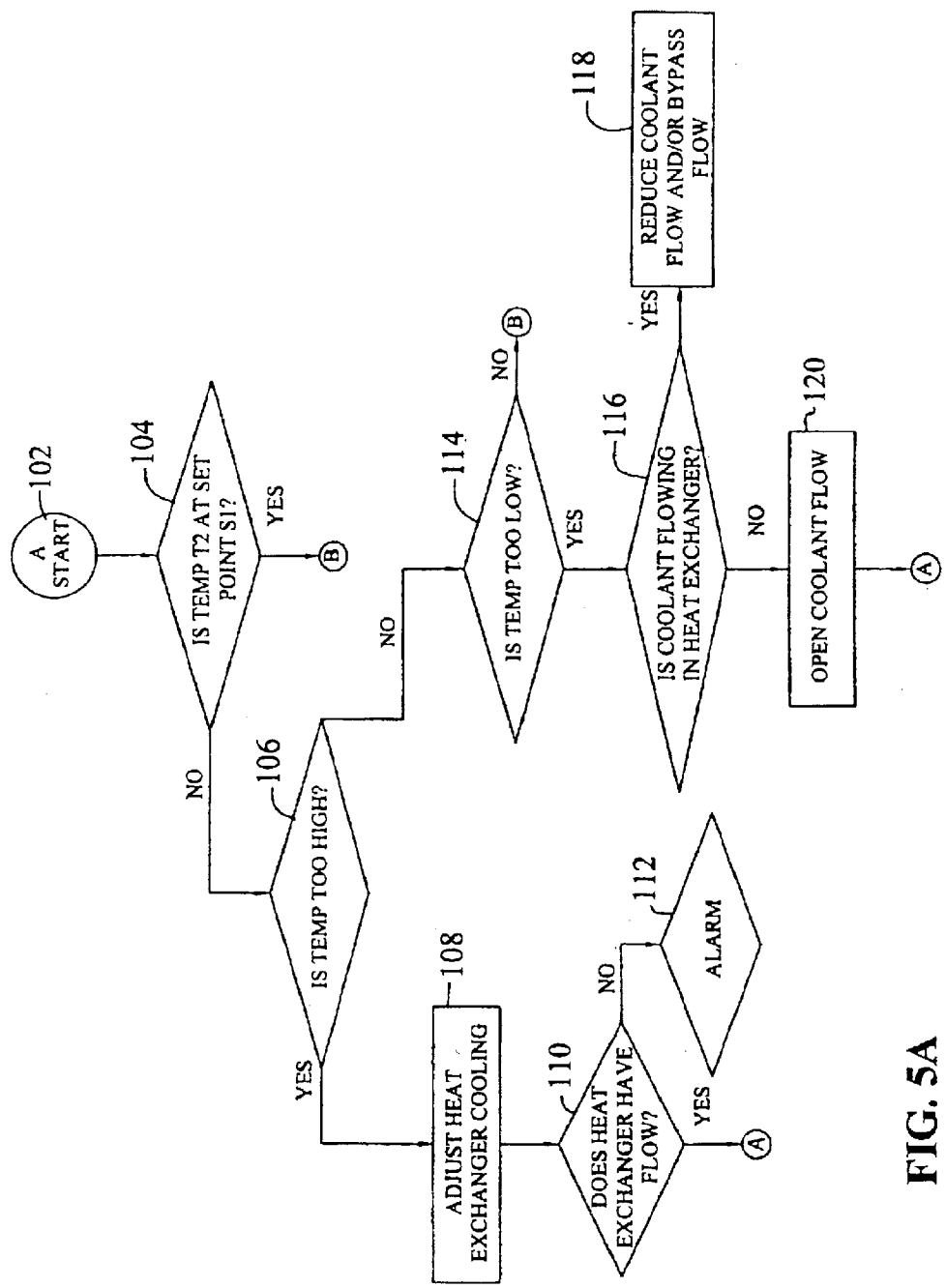
FIGS. 5A–5C are software flow diagrams of the control device of FIG. 3.
Figure 5C:
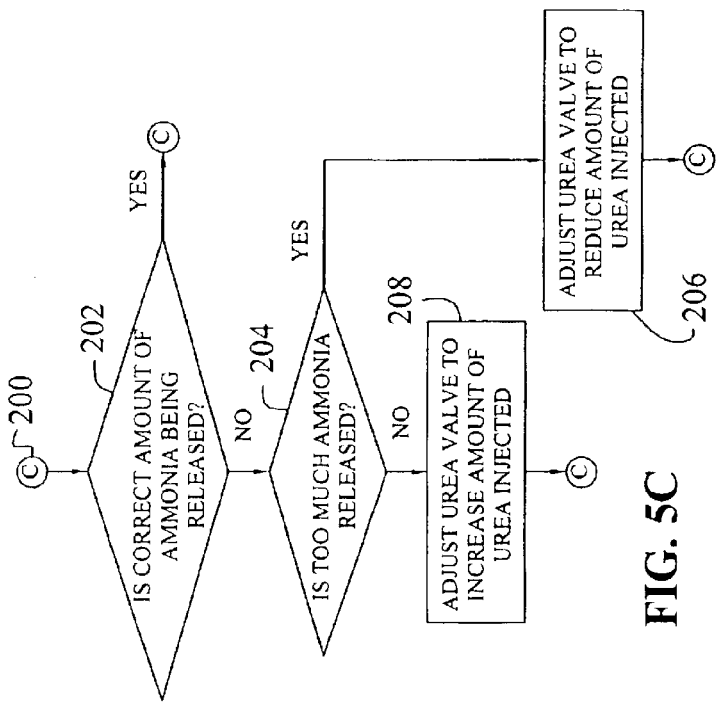
Figure 5B:
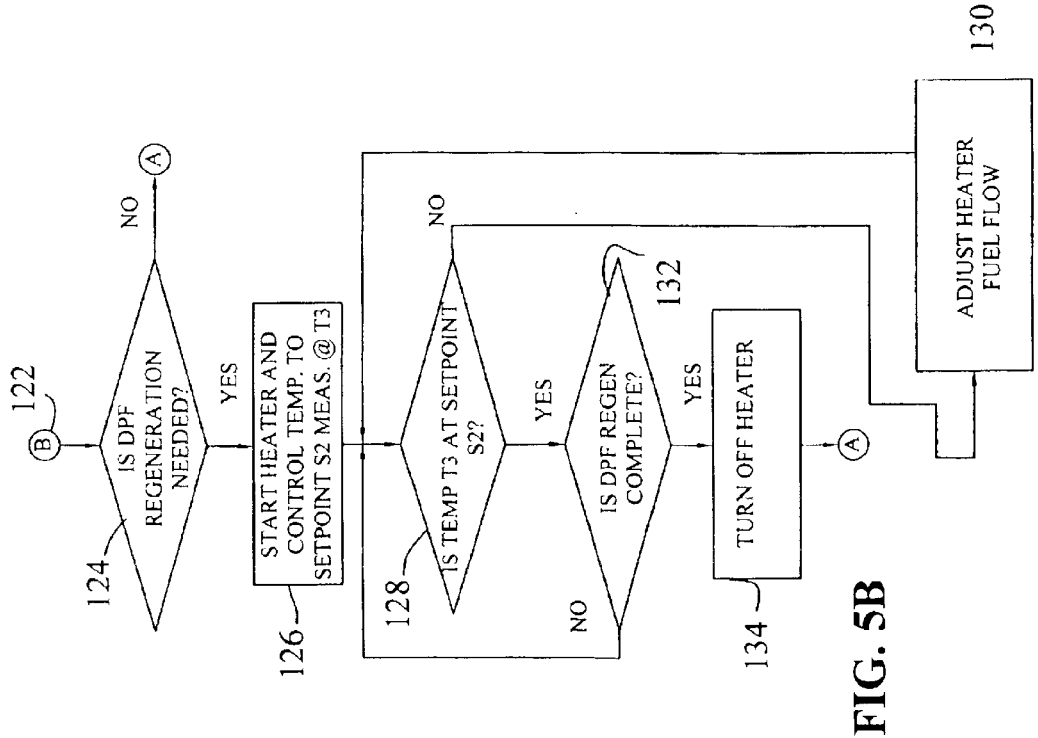

Referring now to FIGS. 5A through 5C, controller 100 contains a processor and software operably associated with the processor and adapted to carry out modules for controlling emission reduction system 10. For the purposes of this invention, a module is a part of the software that contains one or more functions. Each function performs a specific task. Each module includes multiple conditional statements, i.e., statements that enable the modules to act differently each time that they are executed depending on an input value provided by the processor. FIGS. 5A through 5C exhibit the process control flow when the software is executed by control device 100.

Referring to FIG. 5A, when control device 100 executes the software, module A 102 is executed. Module A 102 provides thermal management process control for temperature control of exhaust stream 17 entering SCR system 60. Upon execution of module A 102, conditional statement 104 (i.e., is temperature T2 at set point S1) must be satisfied. If the processor returns input value TRUE, then module A 102 proceeds to module B regarding DPF regeneration. If the processor returns input value FALSE, then module A 102 must satisfy conditional statement 106 (i.e., is temperature too high) before proceeding. If the processor returns input value TRUE, then module A performs module function 108 to adjust the heat exchanger cooling capability. As part of that function, the processor must satisfy conditional statement 110 (i.e., does heat exchanger have flow). If an input value of TRUE is returned by the processor, then module A 102 starts over again; however, if a value of FALSE is returned, then module A 102 sounds alarm 112. Returning to conditional statement 106, if the processor returns a value of FALSE to conditional statement 106, then module A 102 proceeds to a second conditional statement 114 (i.e., is temperature too low). If a value of FALSE is returned regarding conditional statement 114, then the processor proceeds to effectuate module B. If the processor returns a value of TRUE to conditional statement 114, then module A 102 proceeds to conditional statement 116 (i.e., is coolant flowing in heat exchanger). If an input value of TRUE is returned by the processor to conditional statement 116, then module A 102 performs the function of reducing coolant flow and/or bypass flow. After performing function 118, then module A 102 proceeds to return to start and perform again. If an input value of FALSE is returned to conditional statement 116, then module A 102 proceeds to perform function 120 to open the flow of coolant to the heat exchanger. After performing function 120, then module A 102 is re-executed beginning at conditional statement 104.

Referring now to FIG. 5B, module B 122 takes over from module A 102 at certain designated steps, as described above. Module B 122 provides thermal management process control for regeneration of DPF 70 utilized after exhaust stream 17 has passed through SCR system 60. Upon execution of module B 122, conditional statement 124 (i.e., is DPF regeneration needed) must be satisfied. If the processor returns input value FALSE, then module B 122 returns to the start of module A 102. If the processor returns input value TRUE, then module B 122 performs function 126 to adjust heater 80 and control the temperature to set point S2 to be measured at T3. After performing function 126, module B 122 must satisfy conditional statement 128 (i.e., is temperature 3 at set point S2). If the processor returns input value FALSE, then module B 122 performs function 130 to adjust heater 70 fuel flow. After performing function 130, module B 122 again must satisfy conditional statement 128. If the processor returns input value TRUE to conditional statement 128, then conditional statement 132 (i.e., is DPF regeneration complete) must be satisfied by module B 122. If the processor returns input value FALSE, then conditional statements 128 and 132 must be respectively satisfied until the processor returns input value TRUE to both. If the processor returns input value TRUE to conditional statement 132, then module B 122 performs function 134 to turn off heat source 80. After function 134 is performed, module B 122 is directed back to module A 102.

Referring now to FIG. 5C, when control device 100 executes the software, module C 200 is simultaneously executed. Module C 200 provides control of the amount of ammonia being released by SCR 60. Upon execution of module C 200, conditional statement 202 (i.e., is correct amount of ammonia being released) must be satisfied. If the processor returns input value TRUE, then module C 200 is re-executed being at conditional statement 202. If the processor returns input value FALSE, then module C 200 must satisfy conditional statement 204 (i.e., is too much ammonia released). If the processor returns input value TRUE to conditional statement 204, then module C 200 performs function 206 to reduce the amount of urea being injected into SCR system 60 and thereby reduce the amount of ammonia. Once module C 200 has performed function 206, module C 200 is re-executed beginning at conditional statement 202. If the processor returns input value FALSE to conditional statement 204, then module C 200 performs function 208 to adjust the urea valve to increase the amount of urea being injected into SCR system 60. Upon performance of function 208, module C 200 is re-executed beginning at conditional statement 202. Module C 200 may perform for the duration of time that exhaust stream 17 is passing through system 10.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An exhaust emissions reduction system for diesel engines, the diesel engine producing an exhaust stream containing particulate matter and emissions, the exhaust emissions reduction system comprising:

an emissions oxidation device;

a heat exchanger downstream from said emissions oxidation device, said heat exchanger adapted to change a temperature of the exhaust stream;

a selective catalytic reduction device adapted to chemically alter emissions in the temperature adjusted exhaust stream, said selective catalytic reduction device placed downstream from said heat exchanger;

a filter to remove particulate matter from the exhaust stream;

heater placed downstream from said selective catalytic reduction device and upstream from said filter for regenerating said filter;

at least one sensor disposed in the exhaust stream and sensing the temperature of the exhaust stream; and a controller coupled to said heat exchanger and said heater, said controller adapted to control operations of said heat exchanger and said heater based upon the temperature sensed by said sensor.

2. The exhaust emissions reduction system of claim 1 wherein the selective catalytic reduction device is configured to remove NOx from the exhaust stream, and the heater comprises a fuel-fired burner that is placed between the selective catalytic reduction device and the filter and is coupled to the controller.

3. The exhaust emissions reduction system of claim 1 wherein the sensor is a first temperature sensor placed between the selective catalytic reduction device and the heater, further comprising a second temperature sensor placed between the emissions oxidation device and the heat exchanger, a third temperature sensor placed between the heat exchanger and the selective catalytic reduction device, and a fourth temperature sensor placed downstream from the filter, the first, second, third, and fourth temperature sensors being coupled to the controller.

4. A method of reducing emissions produced by a diesel engine comprising:

producing an exhaust stream from the diesel engine;

determining whether a temperature of an upstream portion of the exhaust stream is between a predetermined lower temperature and a predetermined upper temperature and adjusting the temperature of the upstream portion of the exhaust stream to be between the predetermined lower temperature and the predetermined upper temperature in response thereto;

removing NOx from the temperature adjusted upstream portion of the exhaust stream;

increasing the temperature of a downstream portion of the exhaust stream to a particulate matter oxidation temperature; and oxidizing particulate matter with the increased temperature downstream portion of the exhaust stream.

5. The method of claim 4 wherein adjusting the temperature of the upstream portion of the exhaust stream comprises decreasing the temperature of the upstream portion of the exhaust stream.

6. The method of claim 4 comprising sensing the temperature of the exhaust stream (i) upstream from a heat exchanger, (ii) between the heat exchanger and a NOx removal device placed downstream from the heat exchanger, (iii) between the NOx removal device and a diesel particulate filter placed downstream from the NOx removal device, (iv) and downstream from the diesel particulate filter.

7. The method of claim 6 wherein the temperature increasing step comprises operating a fuel-fired burner placed downstream from the NOx removal device and upstream from the diesel particulate filter.

8. The method of claim 6, comprising oxidizing emissions in the exhaust stream upstream from the heat exchanger.

9. An exhaust emission reduction system adapted to reduce the emissions produced in the exhaust stream of a diesel engine, comprising:

a series flow arrangement comprising a cooler for cooling the exhaust stream, a NOx removal device placed downstream from the heat exchanger for removing NOx from the exhaust stream, a heater placed downstream from the NOx removal device, and a diesel particulate filter downstream from the heater for removing particulate matter from the exhaust stream, the heater being for heating the exhaust stream to a filter regeneration temperature for regenerating the diesel particulate filter, and a controller coupled to the cooler and the heater for controlling operation of the cooler and the heater.

10. The exhaust emission reduction system of claim 9 further comprising at least one sensor disposed in the exhaust stream and adapted to sense a temperature of the exhaust stream and pass the sensed temperature to said controller.

11. The exhaust emission reduction system of claim 10 wherein said sensed temperature is compared to a desired temperature range and the temperature of the exhaust stream is adjusted by said controller and said cooler.

12. The exhaust emission reduction system of claim 10 wherein one said sensor is placed in the exhaust stream prior to said cooler and a second said sensor is placed after said cooler such that a temperature of the exhaust stream is sensed prior to and after the exhaust stream is passed through said cooler.

13. The exhaust emission reduction system of claim 9 further comprising a diesel oxidation catalyst upstream from the cooler wherein the exhaust stream passes through said diesel oxidation catalyst prior to passing through said cooler.

14. The exhaust emission reduction system of claim 9 wherein said heater comprises a fuel-fired burner for heating said diesel particulate filter.

15. The exhaust emission reduction system of claim 9 wherein the cooler comprises a heat exchange system placed upstream from the NOx removal device and comprising an exchange path and a bypass path in a parallel flow arrangement with the exchange path, the exchange path comprises a heat exchanger coupled to the controller, and the bypass path comprises a bypass valve coupled to the controller.

16. The exhaust emission reduction system of claim 15 wherein the heat exchanger comprises a coolant valve coupled to the controller.

17. The exhaust emission reduction system of claim 9 further comprising a first temperature sensor upstream from the cooler, a second temperature sensor placed between the cooler and the NOx removal device, a third temperature sensor placed between the NOx removal device and the diesel particulate filter, and a fourth temperature sensor placed downstream from the diesel particulate filter, and the first, second, third, and fourth temperature sensors are coupled to the controller.

18. The exhaust emission reduction system of claim 17 further comprising a diesel oxidation catalyst upstream from the cooler, and the first temperature sensor is placed between the diesel oxidation catalyst and the cooler.

19. The exhaust emission reduction system of claim 9 wherein the NOx removal device comprises a selective catalytic reduction catalyst placed between the cooler and the heater, a hydrolysis catalyst placed between the selective catalytic reduction catalyst and the cooler, an ammonia slip catalyst placed between the selective catalytic reduction catalyst and the heater, and a urea supplier for introducing urea into the exhaust stream between the selective catalytic reduction catalyst and the cooler.

20. The exhaust emission reduction system of claim 9 wherein the series flow arrangement comprises a muffler downstream from the diesel particulate filter.

* * * * *